United States Patent

Batcher

[15] 3,681,781

[45] Aug. 1, 1972

[54] STORING AND RETRIEVAL METHOD

[72] Inventor: Kenneth E. Batcher, Stow, Ohio

[73] Assignee: Goodyear Aerospace Corporation, Akron, Ohio

[22] Filed: Sept. 4, 1970

[21] Appl. No.: 69,831

[52] U.S. Cl. ....................................................444/1
[51] Int. Cl. ...........................G06f 9/00, G06f 15/34
[58] Field of Search ............340/172.5; 343/5; 444/1

[56] References Cited

UNITED STATES PATENTS

| | | | |
|---|---|---|---|
| 3,273,129 | 9/1966 | Mullery et al | 340/172.5 |
| 3,521,277 | 7/1970 | Evans | 343/5 |
| 3,531,775 | 9/1970 | Ishii | 340/172.5 |
| 3,568,155 | 3/1971 | Abraham et al. | 340/172.5 |

*Primary Examiner*—Gareth D. Shaw
*Assistant Examiner*—Melvin B. Chapnick
*Attorney*—J. G. Pere and L. A. Germain

[57] ABSTRACT

The invention relates to a technique for utilizing a general purpose computer controlled by an algorithm to store items from a multi-dimensional space in a store in such a way that retrieval of all items within a given tolerance of a search point can be effected rapidly. Basically, it is the use of unique algorithms in coordinating the function of the general purpose computer and correlator that enable the rapid processing to be achieved. In effect, it is a between limits hashing operation.

7 Claims, 6 Drawing Figures

INVENTOR
KENNETH E. BATCHER
BY
Oldham & Oldham
ATTORNEYS

INVENTOR
KENNETH E. BATCHER
BY Oldham & Oldham
ATTORNEYS

STORING AND RETRIEVAL METHOD

BETWEEN-LIMITS HASHING

Introduction

Hash addressing or hashing is a well known technique for storing a file of data in such a way that the records can be rapidly retrieved based on a single key. The technique is to generate a memory address bin number from the key and either store the record at that address or plant a link at that address which points to the record. Different keys may generate the same bin number so a method of handling a case where more than one record key maps into the same bin is needed. The most common way of handling these overflows is to chain the records in each bin using a link field in each record to point to the next record in the chain.

The normal hashing technique allows "Exact-Match" searches on the specified key. That is, to find a record one must know the exact key under which it is filed. Any errors in the key will cause an error in the bin number generated from it and prevent finding the particular record.

For some problems exact keys are not known and so the normal hashing technique does not work. One class of such problems includes those problems where only approximate key values are known. For instance, in a processor connected to a scanning radar performing a track-while-scan algorithm, the measured position of a target found by the radar must be compared with the predicted positions of aircraft tracks developed from previous radar scans, the correct track being associated with the target and the track being updated to reflect the current measured position. The fact that there are errors in the radar measurements and errors in predicting tracks because of aircraft heading, height and velocity changes means that the search for tracks must find those tracks whose predicted positions agree only approximately with the radar measurements.

Hence, we present some techniques for hashing which allow items to be found from approximate key values rather than exact key values. The item keys are considered to be coordinates of points in a finite Euclidean $n$-space($n$ is any positive integer) and the searches to be searches for points lying within an $n$-cube of fixed dimensions whose center can be any point in the n-space.

In the radar example mentioned above, $n = 3$; the dimensions being latitude, longitude and height of aircraft tracks. The dimensions of the search cube reflect the errors in the radar measurements and the maximum maneuvers an aircraft can be expected to make in between radar scans.

Impossibility of Limiting Every Between-Limits Search to One Bin

In exact-match hashing one bin number is generated from the key and to find the desired record only the records in that bin need be examined. The only way to guarantee single-bin searches in between-limits hashing is to map all of the $n$-space into one bin. This is no longer hash addressing so we exclude this case. If there are two or more bins in the $n$-space then some search cubes overlap bin boundaries. All bins that the cube intersects must be examined for points in the cube so more than one bin needs to be examined in these cases.

Thus, the problem is to divide up a finite n-space into bins in such a way that the maximum number of bins intersected by an n-cube of fixed dimensions but arbitrary center is minimized. At the same time, we want to minimize the volume of the bins to reduce the likelihood of several points being in the same bin.

One-Dimensional Case

Assume $n = 1$. The points corresponding to values of keys lie in an interval of some length, L. Assume the between limits searches to be carried out are for points within a fixed distance, $d$, of an arbitrary point, $x$. Consider a bin which covers all points greater than or equal to $a$ and less than $b$. Assume $b - a < 2d$. If $x$ should equal $(a + b)/2$ then $x - d < a$ and $x + d > b$ and the search interval overlaps the bin $[a, b)$, the bin below and the bin above; three bins at least must be searched. If $b - a \geq 2d$ then for no $x$ will $x - d < a$ and $x + d \geq b$; at most the search interval overlaps only one of the adjacent bins.

If the width of all bins is $2d$ or more no between-limits search with a search interval of $2d$ or less can cover more than two bins.

A good hash algorithm is as follows. The key value of each item being stored is divided by the width of the search interval, $2d$, and the item is put in the bin whose index is the integer part of the quotient. Each between-limits search searches two bins. The center-point of the search interval, $x$, is divided by $2d$ and the integer part of the quotient is used as the index of the first bin to search. If the fractional part of the quotient is ½ or more, then the second bin to search is the bin with the next-higher index; if the fractional part is less than ½ the second bin to search is the bin with the next-lower index.

Mapping Many Dimensions Into One Dimension

A between-limits search problem where $n$ is greater than one can be converted to a one-dimensional problem. Two bins must be searched for each between-limits search. This method has the disadvantage of creating bins with large volumes so in many cases there will be too many items in one bin to permit rapid retrieval.

Assume the between-limits searches to be carried out are for points each of whose coordinates, $y_i$, lie within a fixed distance, $d_i$, of the coordinate, $x_i$, of an arbitrary point $(1 \leq i \leq n)$.

Let $S_i$ for $1 \leq 1 \leq n$ be any set of scaling factors such that the sum of $|S_i| d_i$ over all $i$ is less than or equal to one-half.

If $Y_1, Y_2, \ldots, Y_n$ are the $n$ key values of an item to be stored the item is stored in the bin whose index is the integer part of the sum of $S_i Y_i$ over all $i$.

If $x_1, x_2, \ldots, x_n$ are the $n$ search keys describing the center of a search cube two bins are searched. The first bin is the bin whose index is the integer part of the sum of $S_i x_i$ over all $i$. The second bin is the bin with the next-higher index if the fractional part of the sum is ½ or more while it is the bin with the next-lower index if the fractional part is less than ½.

This search will find all desired points since if $|x_i - y_i| < d_i$ for all $i$ then the sum of $S_i x_i$ and the sum of $S_i Y_i$ differ at most by the sum of $|S_i| d_i$ which is less than equal to ½. The desired points are a subset of all points whose "sums" are within ½ of the search point "sum." The integral and fractional parts of the search point "- sum" determine what integral parts these desired point sums should have.

The scaling factors, $S_i$, can be quite arbitrary, provided the sum of $|S_i| d_i$ is ½ or less. With a particular choice of factors all stored points in the $n$-space are projected onto a line (the "sum" axis) and are binned according to the positions of their projections on this line. A good choice of factors would spread the stored points out so no bin receives too many points.

For a better understanding of the invention reference should be had to the accompanying drawings wherein.

Figure 1:
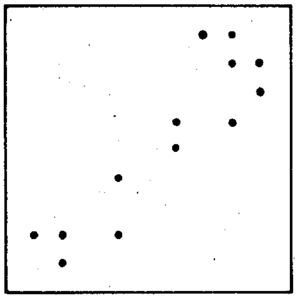
FIG. 1 shows a two-dimensional space with 13 points to be stored.
Figure 2:
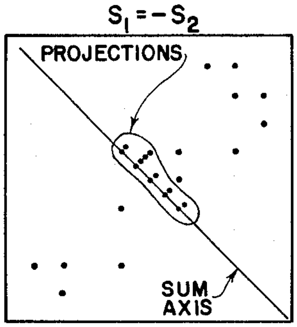
FIG.-2 PRIOR ART
FIG. 2 illustrates a scaling factor picked so that $S_1 = -S_2$ which causes the projections to clump together, and some bins receive many points while others receive none.
Figure 3:
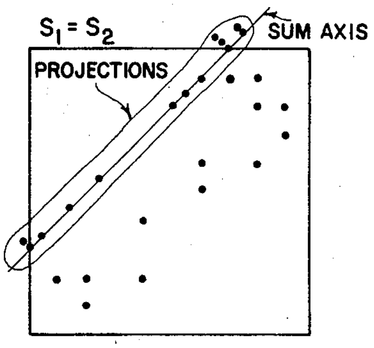
FIG.-3 PRIOR ART
FIG. 3 illustrates a scaling factor picked so that $S_1 = S_2$ which causes the projections to spread apart.

In some cases data points which are spread apart in $n$-space will clump severely when projected onto a line of any orientation. This method will not give a good hashing scheme in these cases. FIG. 1 illustrates the hashing problem. FIG. 2 illustrates one conventional approach to solve it, but ends up in a bad clumping of points. FIG. 3 is somewhat better than FIG. 2 because things are spread out more. The method described below is better.

Brick Wall Method

In this method a digital computer is programmed so that $n$-space is divided up into bins in such a way that a search cube can never intersect more than $n + 1$ bins. The bin volumes are not large so clumping of several points into one bin will be relatively rare. The name "-brick wall" comes from the fact that the pattern of bins resembles the common brick wall.

Let $n$ be the number of dimensions of the search. Let $d_i$ be the tolerance allowed in the $i^{th}$ dimension; that is we want to find points each of whose coordinates, $Y_i$, lie within $d_i$ of the $i^{th}$ coordinate of arbitrary search point, $x_i$.

Bins will be indexed with $n$-dimensional vectors of integers. The $n$-dimensional integer vector of a bin can be easily transformed to a single integer which becomes its address in memory. For instance, one can weight the components with a set of weights and add the weighted components of the integer vector to obtain a single integer wherein;

Let $(Y_1, Y_2, \ldots, Y_n)$ be the $n$ coordinates of a point to be stored. The point is stored in bin $(b_1, b_2, \ldots, b_n)$where $b_1$ = integer part of $Y_1 / 2d_1$ and $$b_i = \text{integer part of } \left(Y_i/2d_i + \sum_{k=1}^{i-1} b_k\right)/i \quad (\text{for } 2 \le i \le n).$$

Figures 4, 6:
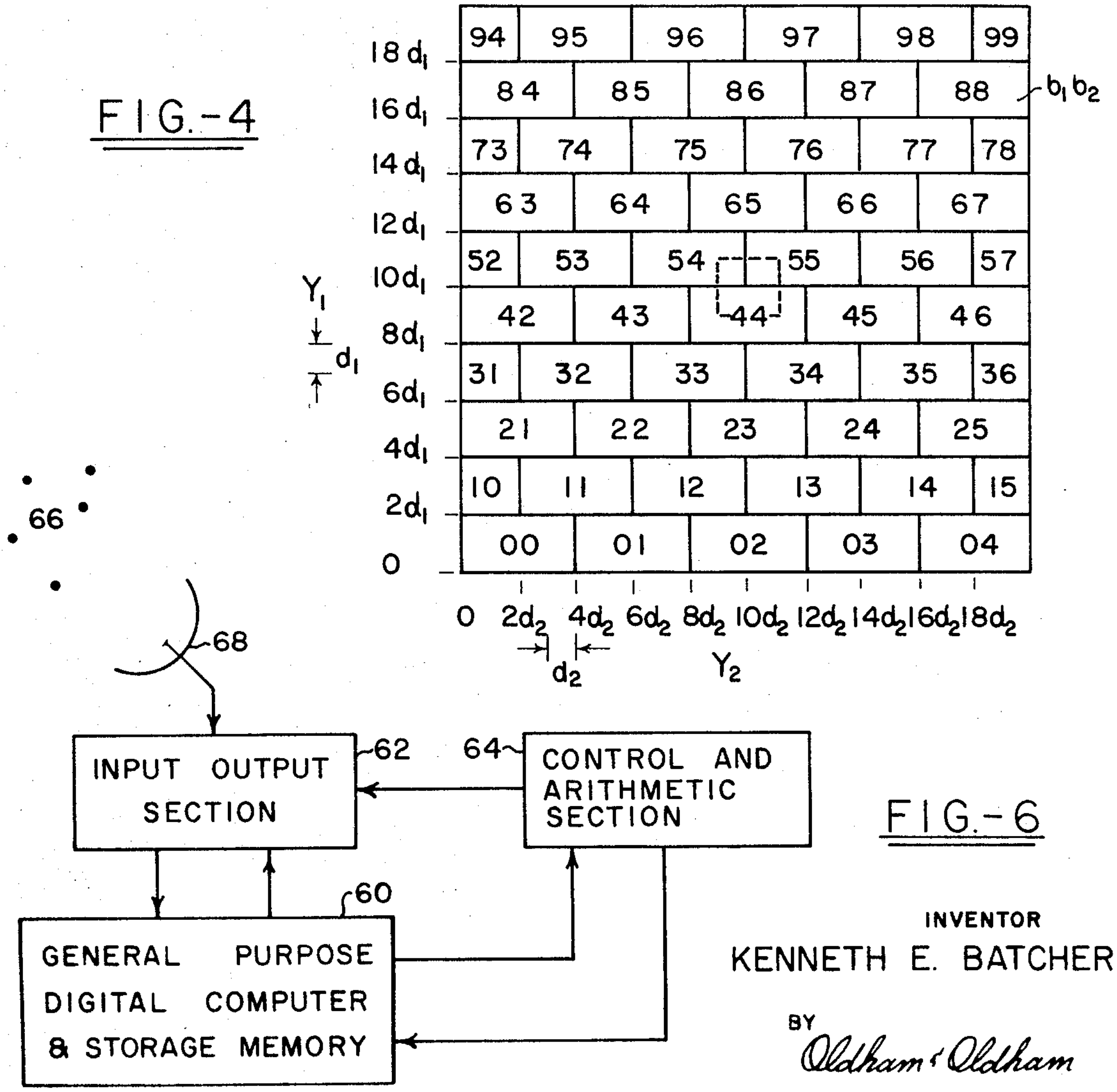
FIG. 4 illustrates the bin arrangements for a two space.
FIG. 6 illustrates a general scheme for operation of the method of the invention with a computer and storage means.

FIG. 4 shows the bins for two-space. The length of $d_1$ and $d_2$ are indicated on the figure and the bin indices are indicated inside the bins. Note that a rectangle of length $2d_2$ and height $2d_1$ intersects exactly three bins no matter where it is placed on the diagram as long as its sides are oriented with the axes. Also, note that the sums of the bin indices $(b_1 + b_2)$ for each of the three bins it intersects are three successive integers, for example, the dotted rectangle in FIG. 4 intersects bins 44, 54 and 55 with index sums 8, 9, and 10, respectively.

For $n$ dimensions an oriented $n$-cube with any arbitrary center $(x_1, x_2, \ldots, x_n)$ and side dimensions $2d_1$, 2, $d_2, \ldots, 2d_n$, respectively, will intersect $n + 1$ bins and the index-sums of the $n + 1$ bins are $n + 1$ successive integers. This can be easily proven by induction on $n$.

Figure 5:
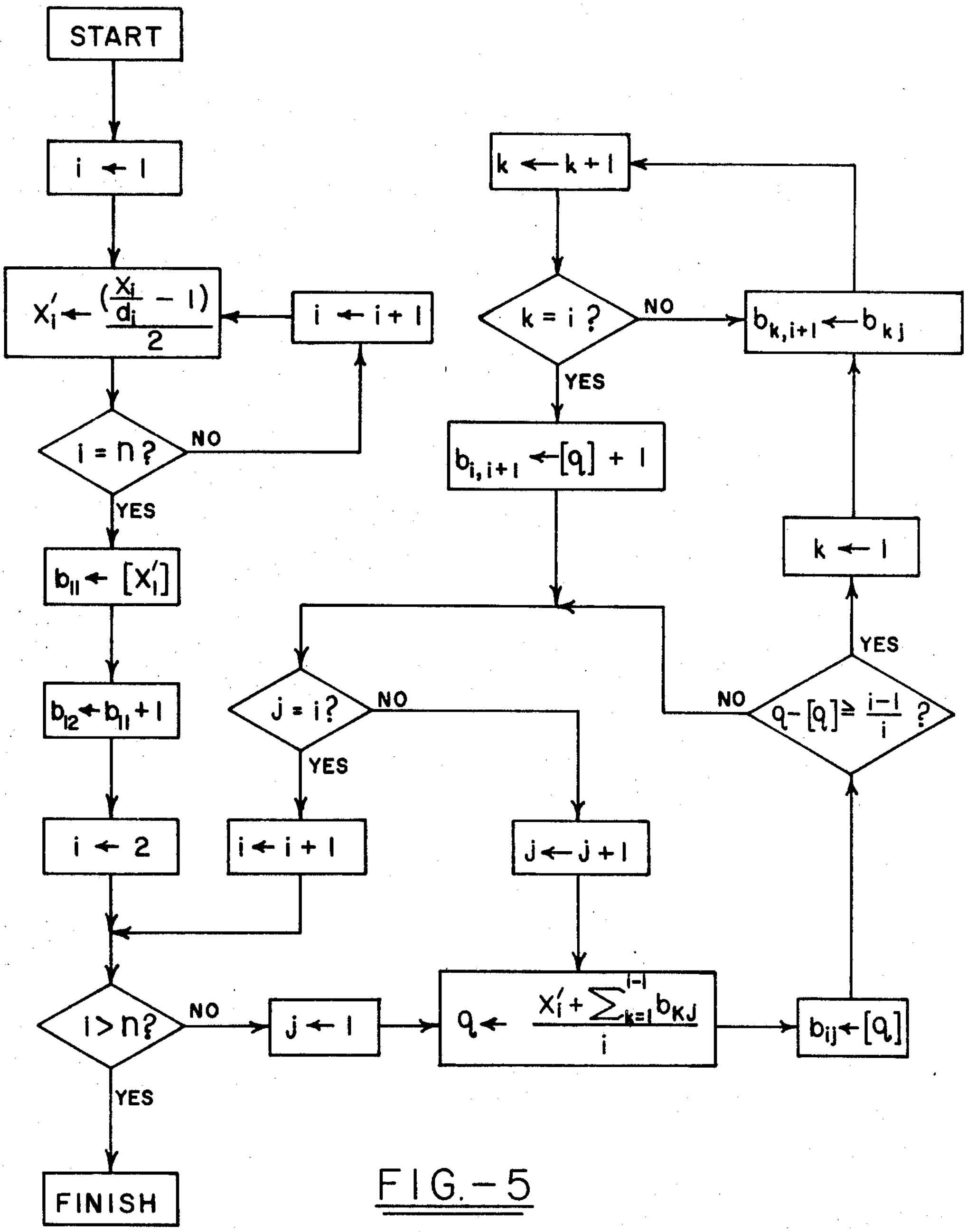
FIG. 5 illustrates the algorithm for finding the indices of the intersected bins.

The algorithm for finding the indices of the intersected bins is charted in FIG. 5. The nomenclature is as follows:

$d_i$ = tolerance in $i^{th}$ dimension $x_i'$ = $i^{th}$ coordinate of center of search cube $bi_j$ = $i^{th}$ index of bin $j$ $n$ = number of coordinates $[x]$= greatest integer not more than $x$.

In words the algorithm is as follows:

1. For each coordinate of the center point of the search divide the coordinate value $x_i$ by the search tolerance $d_i$ of the corresponding dimension, subtract unity and divide by two to obtain the transformed coordinate $x_i$;

2. Truncate the first transformed coordinate $x_1'$ to an integer to obtain the first index $b_{11}$ of the first search bin;

3. Add unity to the first index $b_{11}$ of the first search bin to obtain the first index $b_{12}$ of the second search bin;

4. If the number of dimensions in the search space is two or more then for each of the first two bins;

5. Add the first index $b_{11}$ of the bin to the second transformed coordinate $x_2'$, divide by two, and separate the quotient into an integral part $[q]$ and a fractional part;

6. Use the integral part $[q]$ of the quotient as the second index $b_{21}$ of the bin. If the fractional part is equal to or greater than one-half of unity then use the first index $b_{11}$ of the bin as the first index $b_{13}$ of the third search bin, and the integral part $[q]$ of the quotient plus one as the second index $b_{23}$ of the third bin;

7. If the number of dimensions in the search space is three or more then for each of the first three bins;

8. Add the sum of the first two indices $b_{11}$ , $b_{21}$ of the bin to the third transformed coordinate $x_3'$, divide by three and separate the quotient into an integral part $[q]$ and a fractional part. Use the integral part of the quotient as the third index $b_{31}$ of the bin. If the fractional part is equal to or greater than two-thirds of unity then use the first two indices $b_{11}$ , $b_{21}$ of the bin as the first two indices $b_{14}$, $b_{24}$ of the fourth search bin and the integral part $[q]$ plus one as the third index $b_{34}$ of the fourth bin.

If the umber of dimensions in the search space is four or more then for each of the first four bins add the sum of the first three indices of the bin to the fourth transformed coordinate, divide by four and separate the quotient into an integral part and a fractional part. Use the integral part of the quotient as the fourth index of the bin. If the fractional part is equal to or greater than three-fourths of unity then use the first three indices of the bin as the first three indices of the fifth search bin and the integral part plus one as the fourth index of the fifth bin.

If the number of dimensions in the search space is five or more then for each of the first five bins add the sum of the first four indices of the bin to the fifth transformed coordinate, divide by five and separate the quotient into an integral part and a fractional part. Use the integral part of the quotient as the fifth index of the bin. If the fractional part is equal to or greater than four-fifths of unity then use the first four indices of the bin as the first four indices of the sixth search bin and the integral part plus one as the fifth index of the sixth bin.

If the number of dimensions is six or more then for each dimension past the fifth perform a step similar to the above with certain modifications. For the $i^{th}$ dimension the step is: For each of the first $i$ bins, add the sum of the first $i-1$ indices of the bin to the $i^{th}$ transformed coordinate, divide by $i$ and separate the quotient into an integral part and a fractional part. Use the integral part of the quotient as the $i^{th}$ index of the bin. If the fractional part is equal to or greater than $i-1$ $i^{ths}$ of unity then use the first $i-1$ indices of the bin as the first $i-1$ indices of the $i+1^{th}$ search bin and the integral part plus one as the $i^{th}$ index of the $i+1^{th}$ bin.

At the conclusion there is one more search bin than the number of dimensions in the search space, each with a number of indices equal to the number of dimensions.

A typical computer program to encompass the algorithm of FIG. 5 and the description above is set forth in (USA) Fortran (Standard Programmer Language) as follows:

```
COLUMNS    (USA) FORTRAN (STANDARD
           PROGRAMMER LANGUAGE)
 1  4  7
           SUBROUTINE GENIND (N, X, INDEX, D)
 C         N=NUMBER OF DIMENSIONS.
 C         X IS AN ARRAY OF N REALS.
 C         X(I)=I-TH COORDINATE OF CENTER OF
             SEARCH.
 C         INDEX IS AN ARRAY OF N BY (N+1)
             INTEGERS.
 C         INDEX (I,J)=I-TH INDEX OF BIN J.
 C         GIVEN N, X AND D GENIND
             GENERATES THE INDICES
           OF BINS TO SEARCH IN INDEX.
 C         D IS AN ARRAY OF N REALS.
 C         D(I)=SEARCH TOLERANCE IN I-TH
             DIMENSION.
           DO 10 I=1, N
    10     X(I)=(X(I)/D(I) - 1.0)*0.5
           INDEX (1,1)=X(1)
           INDEX (1,2)=INDEX (1,1)+1
           IF (N-1) 70, 70, 20
    20     DO 60 I=2, N
           IP1=I+1
           IM1=I-1
           AI=I
           AIM1=IM1
           DO 60 J=1,I
           JSUM=0
           DO 30 K=1,IM1
    30     JSUM=JSUM+INDEX (K,J)
           SUM=JSUM
           QUOT=(X(I)+SUM)/AI
           INDEX (I,J)=QUOT
           A INDEX=INDEX (I,J)
           IF (AI*(QUOT-A INDEX)—AIM1)60,40,40
    40     DO 50 K=1,IM1
    50     INDEX (K,IP1)=INDEX (K,J)
           INDEX (I,IP1)=INDEX (I,J)+1
    60     CONTINUE
    70     RETURN
           END
```

A SIGMA 5, general purpose digital computer as manufactured by Scientific Data System which now is a division of XEROX Corporation would handle the program control desired by the invention.

The data is stored in memory by the Algorithm as depicted by the program to essentially define the physical bin arrangement of FIG. 4.

FIG. 6 illustrates a computer and storage memory 60 cooperating with an input-output section 62 and a control and arithmetic section 64. The input information from the $n$ space is aircraft targets 66 being detected by a suitable radar 68 for input to section 62. The method of the invention operates through the section 64 to properly divide the storage area of the memory 60 and properly coordinate the section 62 to follow the appropriate rules and guidelines.

Conclusions

The brick wall method allows a between-limits search to be conducted in $n$-space by searching $n+1$ bins. The bins are relatively small so the probability of a bin containing many points is small. If the number of bins is too large they can be combined as necessary to reduce the number of memory addresses needed.

By mapping $n$-space onto a line in a special way the number of bins to be searched for a between-limits search can be reduced to two. Unfortunately this method creates rather large bins which may contain many points in certain situations.

Therefore, in accordance with the Patent Statutes I have described the preferred embodiment of my method to coordinate a general purpose digital computer to enhance storage and retrieval of data therewithin in reduced times. However, it is to be understood that my invention is not to be limited thereto or thereby, but the scope of the invention is defined in the appended claims.

What is claimed is:

1. A method for the storage and retrieval of information which comprises the steps of controlling an information storage mechanism to a. divide $n$ space into bins in such a way that any search cube of a preselected size intersects at most $n+1$ bins, b. index the bins with $n$-dimensional vectors of integers, c. transform the $n$-dimensional vector of each bin designating vector into a single integer to provide a bin address, and d. pass information to and from the bins according to the assumption that a between limits search is to be carried out for points in said search cube.

2. A method according to claim 1 where the n space is divided so that the search cube intersects two bins at most according to a scaling factor $S_i$ chosen so that the sum of $|S_i| d_i$ is ½ or less where $d_i$ is a fixed distance defining the between limits search field and $i$ is an integer $1 \le i \le n$.

3. A method according to claim 1 which includes the step of detecting aircraft positions by radar to provide the input information, and where step (a) divides the $n$ space into a common brick wall pattern of bins.

4. A method for the storage and retrieval of information representing random points in space which comprises the steps of controlling a general purpose digital computer according to the following steps;

1. selecting a center point, and for each coordinate of the center point dividing the coordinate value by a predetermined search tolerance, subtracting unity, and dividing by two to obtain a transformed coordinate,
2. truncate the first transformed coordinate to an integer to obtain the first index of the first bin,
3. add unity to the first index of the first bin to obtain the first index of the second bin,
4. for each of the first two bins add the first index of the bin to the second transformed coordinate, divide by two, and separate the quotient as the second index of the bin, and if the fractional part is equal to or greater than one-half of unity then use the first index of the bin as the first index of the third bin, and the integral part of the quotient plus one as the second index of the third bin.

5. A method according to claim 4 where if the number of dimensions in the space is three or more, for each of the first three bins:

add the sum of the first two indices of the bin to the third transformed coordinate, divide by three and separate the quotient into an integral part and a fractional part, and use the integral part of the quotient as the third index of the bin, and if the fractional part is equal to or greater than two-thirds of unity then use the first two indices of the bin as the first two indices of the fourth bin and the integral part plus one as the third index of the fourth bin.

6. A method according to claim 5 where if the number of dimensions in the space is four or more for each of the first four bins add the sum of the first three indices of the bin to the fourth transformed coordinate, divide by four and separate the quotient into an integral part and a fractional part, and use the integral part of the quotient as the fourth index of the bin, and if the fractional part is equal to or greater than three-fourths of unity then use the first three indices of the bin as the first three indices of the fifth bin and the integral part plus one as the fourth index of the fifth bin.

7. A method according to claim 6 where if the number of dimensions is $i$ or more then for each of the first $i$ bins 5. add the sum of the first $i-1$ indices of the bin to the $i^{th}$ transformed coordinate and divide by $i$ and separate the quotient into an integral part and a fractional part, and
6. use the integral part of the quotient as the $i^{th}$ index of the bin, and if the fractional part is equal to or greater than $i-1$ $i^{ths}$ of unity then using the first $i-1$ indices of the bin as the first $i-1$ indices of the $i+1^{th}$ search bin and the integral part plus 1 as the $i^{th}$ index of the $i+1^{th}$ bin, and
7. repeat steps (5) and (6) sequentially until all dimensions have been completed.

* * * * *

UNITED STATES PATENT OFFICE
CERTIFICATE OF CORRECTION

Patent No. 3,681,781 Dated August 1, 1972

Inventor(s) Kenneth E. Batcher

It is certified that error appears in the above-identified patent and that said Letters Patent are hereby corrected as shown below:

Column 3, line 65, change "$b_1$" to --$b_i$--.

Column 4, line 12, change "2, $d_2$" to --2$d_2$--.

Column 4, line 29, change "$x_i$." to --$x_i$'--.

Signed and sealed this 23rd day of January 1973.

(SEAL)
Attest:

EDWARD M.FLETCHER,JR.
Attesting Officer

ROBERT GOTTSCHALK
Commissioner of Patents